//  
US005581276A

United States Patent [19]
Cipolla et al.

[11] Patent Number: 5,581,276
[45] Date of Patent: Dec. 3, 1996

[54] 3D HUMAN INTERFACE APPARATUS USING MOTION RECOGNITION BASED ON DYNAMIC IMAGE PROCESSING

[75] Inventors: Roberto Cipolla, Cambridge, United Kingdom; Yasukazu Okamoto, Chiba-ken; Yoshinori Kuno, Osaka-fu, both of Japan

[73] Assignee: Kabushiki Kaisha Toshiba, Kawasaki, Japan

[21] Appl. No.: 117,930

[22] Filed: Sep. 8, 1993

[30]     Foreign Application Priority Data

Sep. 8, 1992  [JP]  Japan ................................. 4-239853

[51] Int. Cl.$^6$ ........................................................ G09G 5/00
[52] U.S. Cl. ............................................ 345/156; 395/135
[58] Field of Search ..................................... 382/190, 199, 382/201, 203; 348/13, 20; 395/135; 345/156

[56]                  References Cited

U.S. PATENT DOCUMENTS

| | | | |
|---|---|---|---|
| 4,685,143 | 8/1987 | Choate | 382/199 X |
| 4,843,568 | 6/1989 | Krueger et al. | 382/190 |
| 4,977,603 | 12/1990 | Irie et al. | 382/203 X |
| 5,252,951 | 10/1993 | Tannenbaum et al. | 345/156 |
| 5,263,097 | 11/1993 | Katz et al. | 382/190 |

FOREIGN PATENT DOCUMENTS

| | | |
|---|---|---|
| 3-006780 | 1/1991 | Japan . |
| 3-006782 | 1/1991 | Japan . |

OTHER PUBLICATIONS

Christopher Schmandt et al, "The Intelligent Voice–Interactive Interface", Human Factors In Computer Systems, Mar. 1982, pp. 363–366.

Brenda Laurel, The Art of Human–Computer Interface Design, Addison–Wesley Publishing Co., 1990, pp. 309–317.

Hemmi et al., *3–D Natural Interactive Interface–Using marker tracking from a single view*, Systems & Computers in Japan, vol. 23, No. 11, 1992, pp. 62–73.

Denshi Joho Tsushin Gakkai Ronbunshi, vol. 74–D–II, No. 9, Sep. 1991, pp. 1264–1272.

Rangarajan et al., *Establishing motion correspondence*, Computer Vision Graphics and Image Processing: Image Understanding, vol. 54, No. 1, Jul. 1991, pp. 56–73.

Longuet–Higgins, "A Computer Algorithm For Reconstructing A Scene From Two Projections", *Nature*, vol. 293, pp. 133–135 (Sep. 1981).

Koenderink et al., "Affine Structure From Motion", *Opt. Soc. Am. A*, vol. 8, No. 2, pp. 377–385 (Feb. 1991).

*Primary Examiner*—Ulysses Weldon
*Attorney, Agent, or Firm*—Foley & Lardner

[57]                    ABSTRACT

A 3D human interface apparatus using a motion recognition based on a dynamic image processing in which the motion of an operator operated object as an imaging target can be recognized accurately and stably. The apparatus includes: an image input unit for entering a plurality of time series images of an object operated by the operator into a motion representing a command; a feature point extraction unit for extracting at least four feature points including at least three reference feature points and one fiducial feature point on the object, from each of the images; a motion recognition unit for recognizing the motion of the object by calculating motion parameters, according to an affine transformation determined from changes of positions of the reference feature points on the images, and a virtual parallax for the fiducial feature point expressing a difference between an actual position change on the images and a virtual position change according to the affine transformation; and a command input unit for inputting the command indicated by the motion of the object recognized by the motion recognition unit.

15 Claims, 10 Drawing Sheets

FIG.5
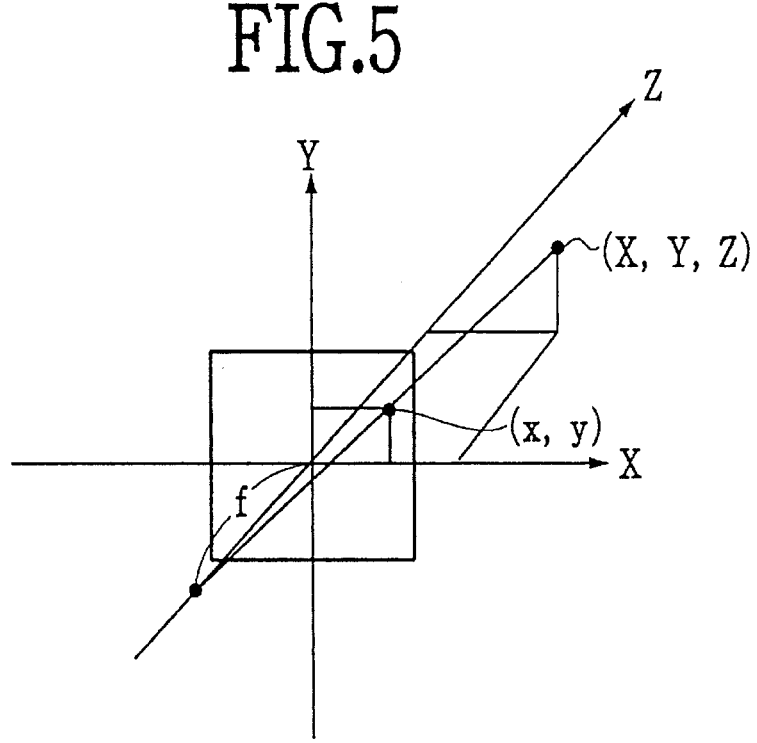
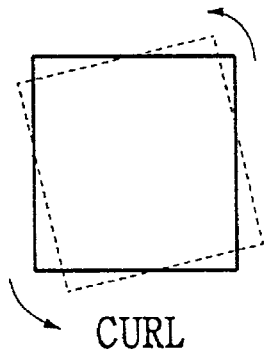
FIG.6A
CURL
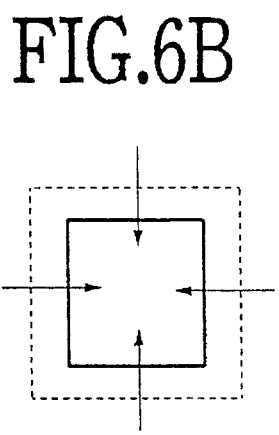
FIG.6B
DIVERGENCE
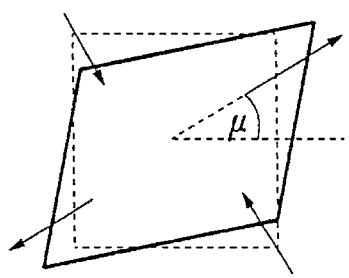
FIG.6C
DEFORMATION

3D HUMAN INTERFACE APPARATUS USING MOTION RECOGNITION BASED ON DYNAMIC IMAGE PROCESSING

BACKGROUND OF THE INVENTION

1. Field of the Invention

The present invention relates to a 3D human interface apparatus for facilitating 3D pointing and controlling command inputs by an operator, which utilizes a motion recognition technique for determining the motion of an operator operated object according to changes of the feature points of the object on a plurality of images of the object.

2. Description of the Background Art

There are several conventional propositions for a scheme for obtaining a structure of an object imaged on a plurality of images.

For example, there is a scheme described by S. Ullman in "The interpretation of visual motion", MIT Press, Cambridge, U.S.A., 1991. for determining the structure and the motion of four non-coplanar points on a rigid object from at least three parallel projection images in which the correspondences of these four points are known.

Also, there is a scheme described by H.C. Longuest-Higgins in "A computer algorithm for reconstructing a scene from two projections", Nature, 293, pp. 133–135, 1981, which is a linear calculation scheme for obtaining the structure and the motion of eight corresponding points on two perspective transformed images.

Also, O. D. Faugeras and J. Maybank describes in "Motion from point matches: multiplicity of solutions", IEEE Workshop on MOtion, pp. 248–255, 1989, that there are only a finite number of the structures and the motions that can satisfy the correspondences among five points on two perspective projection images.

Also, Japanese Patent Application Laid Open (Kokai) No. 3-6789 (1991) discloses a scheme for determining a 3D rotational motion from corresponding points on two images first, and then determining a 3D positional relationship with one of the corresponding points as a reference point from the determined rotational motion data.

All of these propositions belong to a type of scheme which sets up equations between the 3D coordinates of the object and the coordinates on the perspective projection images of this object, and solves these equations to obtain the answer.

In this type of scheme, the structure and the motion of the object can be calculated efficiently when an imaging target object is positioned very close to an imaging device such that it appears large in the images.

However, when the area occupied by the imaging target object in the image is small or when the distance between the imaging device and the imaging target object is large, as in the actual processing images, the deformation of the image due to the perspective projection on a basis of which the motion of the object is to be calculated becomes small, so that the calculation result becomes unstable. Namely, in such a case, it becomes difficult to distinguish the parallel displacement in a direction perpendicular to the viewing direction and the rotation around an axis perpendicular to a direction of that parallel displacement, for example.

In addition, when the effect of the perspective projection is small, there arises an ambiguity in the depth, such that it becomes difficult to distinguish the nearby object with not so well defined features from the distant object with well defined features, or to distinguish the motion of the nearby small object from the motion of the distant large object.

On the other hand, there is also a type of scheme described by J. J. Koenderink and A. J. van Doorn in "Affine structure from motion", Journal of Optical Society of America, Vol. 8, No. 2, pp. 377–385, 1991, in which the motion of the object is expressed by the affine transformation (linear transformation), according to which the structure of the object is determined. In this scheme, a rough structure of the object can be calculated from two frames of the dynamic images of the object.

However, in the structure of the object calculated by this scheme, the data along the depth direction involve an unknown coefficient proportional to a distance from the camera to the object, so that it is difficult to calculate the motion of the object according to the structure calculated by this scheme.

SUMMARY OF THE INVENTION

It is therefore an object of the present invention to provide a 3D human interface apparatus using a motion recognition based on a dynamic image processing in which the motion of an operator operated object as an imaging target can be recognized accurately and stably, without being influenced by the ambiguity associated with the perspective projection.

According to one aspect of the present invention there is provided a 3D human interface apparatus for facilitating 3D pointing and controlling command inputs by an operator, comprising: image input means for entering a plurality of time series images of an object operated by the operator into a motion representing a command; feature point extraction means for extracting at least four feature points including at least three reference feature points and one fiducial feature point on the object, from each of said images; motion recognition means for recognizing the motion of the object by calculating motion parameters, according to an affine transformation determined from changes of positions of the reference feature points on said images, and a virtual parallax for the fiducial feature point expressing a difference between an actual position change on said images and a virtual position change according to the affine transformation; and command input means for inputting the command indicated by the motion of the object recognized by the motion recognition means.

According to another aspect of the present invention there is provided a 3D human interface apparatus for facilitating 3D pointing and controlling command inputs by an operator, comprising: image input means for entering a plurality of time series images of an object operated by the operator into a motion representing a command; feature point extraction means for extracting a multiplicity of feature points distributed over an entire imaging field of said images; object detection means for detecting the object in said images by calculating translational motion directions on said images for said multiplicity of feature points, plotting a distribution plot of the translational motion directions over the entire imaging field, and separating an area having identical and distinctive translation motion directions distributed therein in the distribution plot as the object; motion recognition means for recognizing the motion of said area separated as the object by image processing said images; and command input means for inputting the command indicated by the motion of the object recognized by the motion recognition means.

According to another aspect of the present invention there is provided a 3D human interface apparatus for facilitating 3D pointing and controlling command inputs by an operator, comprising: image input means for entering a plurality of images of an object operated by the operator into a motion representing a command; feature point extraction means for extracting a multiplicity of feature points distributed over the object in said images; structure extraction means for extracting a structure of the object by determining relative positions of said multiplicity of feature points in a depth direction on said images according to a ratio of virtual parallaxes for each two closely located ones of said multiplicity of feature points, each virtual parallax expressing a difference between an actual position change on said images and a virtual position change according to an affine transformation determined from changes of positions of the feature points on said images; motion recognition means for recognizing the motion of the object by image processing said images; command input means for inputting the command indicated by the motion of the object recognized by the motion recognition means; and display means for displaying a 3D model having the structure of the object as extracted by the structure extraction means which moves in accordance with the motion indicated by the command inputted by the command input means.

According to another aspect of the present invention there is provided a 3D human interface apparatus for facilitating 3D pointing and controlling command inputs by an operator, comprising: image Input means for entering a plurality of images of an object operated by the operator into a motion representing a command; motion recognition means for recognizing the motion of the object by image processing said images; and command input means for inputting the command indicated by the motion of the object recognized by the motion recognition means.

Other features and advantages of the present invention will become apparent from the following description taken in conjunction with the accompanying drawings.

BRIEF DESCRIPTION OF THE DRAWINGS

FIG. 5 is a diagram for explaining the perspective projection relationship between the object and the observer used in the apparatus of FIG. 1.

FIGS. 6A, 6B, and 6C are illustrations of three invariant features in the affine transformation used in the affine flow calculation to be carried out in the apparatus of FIG. 1.

DETAILED DESCRIPTION OF THE PREFERRED EMBODIMENTS

Figure 1:
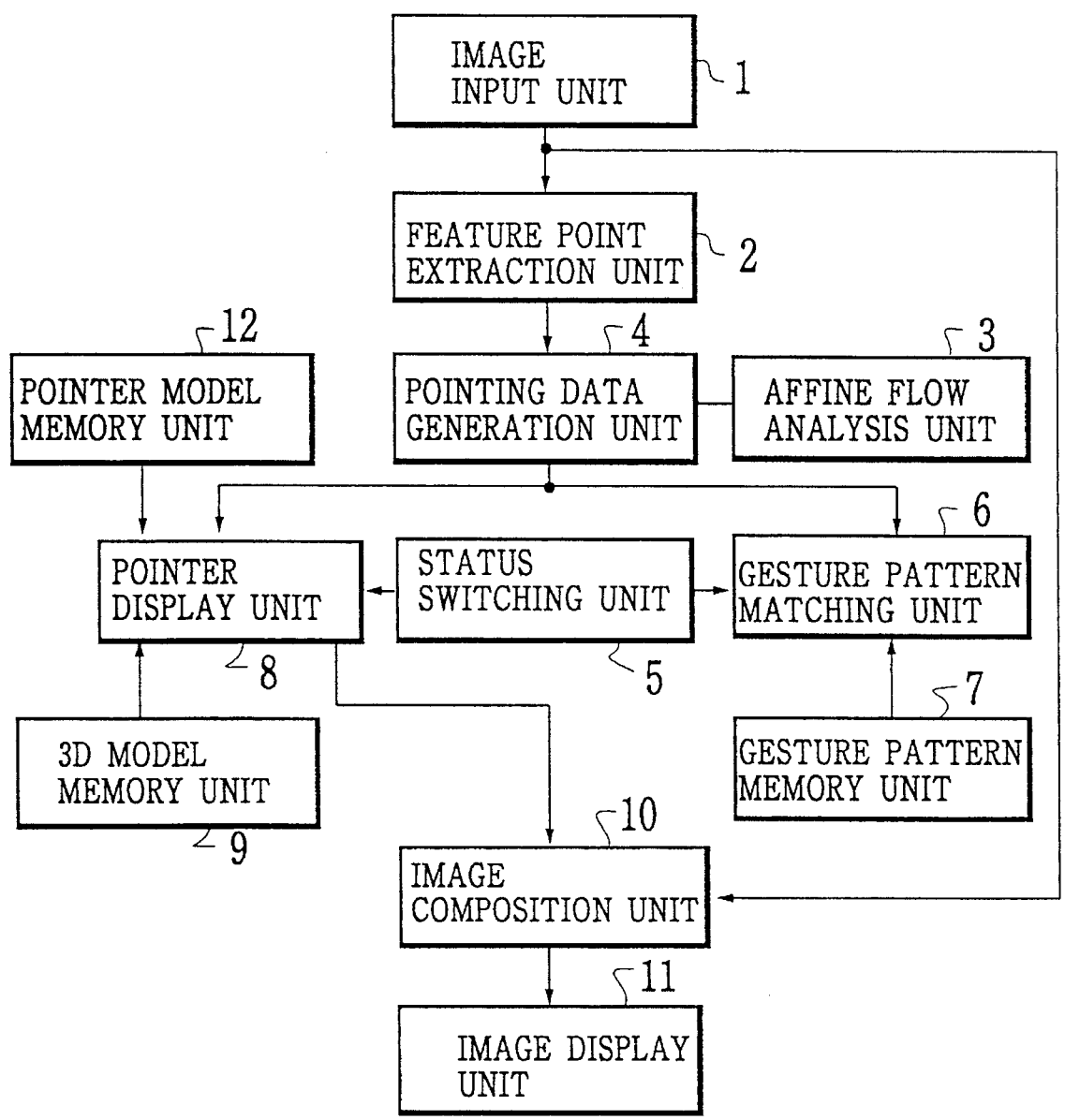
FIG. 1 is a schematic block diagram of a first embodiment of a 3D human interface apparatus according to the present invention.

Referring now to FIG. 1, a first embodiment of a 3D human interface apparatus using a motion recognition based on a dynamic image processing according to the present invention will be described in detail.

This first embodiment concerns with a 3D human interface apparatus to be utilized for commanding a motion and a posture of a numerically expressed 3D model. As shown in FIG. 1, this 3D human interface apparatus comprises an image input unit 1 connected with a pointing data generating unit 4 through a feature point extraction unit 2, an affine flow analysis unit 3, a gesture pattern matching unit 6, and a pointer display unit 8 connected with the pointing data generation unit 4, a gesture pattern memory unit 7 connected with the gesture pattern matching unit 6, a 3D model memory unit 9 and a pointer model memory unit 12 connected with the pointer display unit 8, a status switching unit 5 connected between the gesture pattern matching unit 6 and the pointer display unit 8, an image composition unit connected with the image input unit 1 and the pointer display unit 8, and an image display unit 11 connected with the image composition unit 10, each of which will now be described in detail.

The image input unit 1 has an imaging means such as a video camera for imaging a moving operator operated object whose motion commands the motion and the posture of the 3D model, and supplies time series image data of the images taken by the imaging means into the feature point extraction unit 2. Here, the images can be taken in any convenient manner. For example, an operator operating the object in front of the image display unit 11 displaying the 3D model can be imaged from a ceiling directly above the operator or from a camera mounted on the image display unit directly facing toward the operator. The images can also be taken as a combination of a plurality of images taken by a plurality of cameras which are appropriately arranged around the operator, where each camera has a narrow view field and a long focal distance in order to suppress the effect of the perspective projection.

Figure 2:
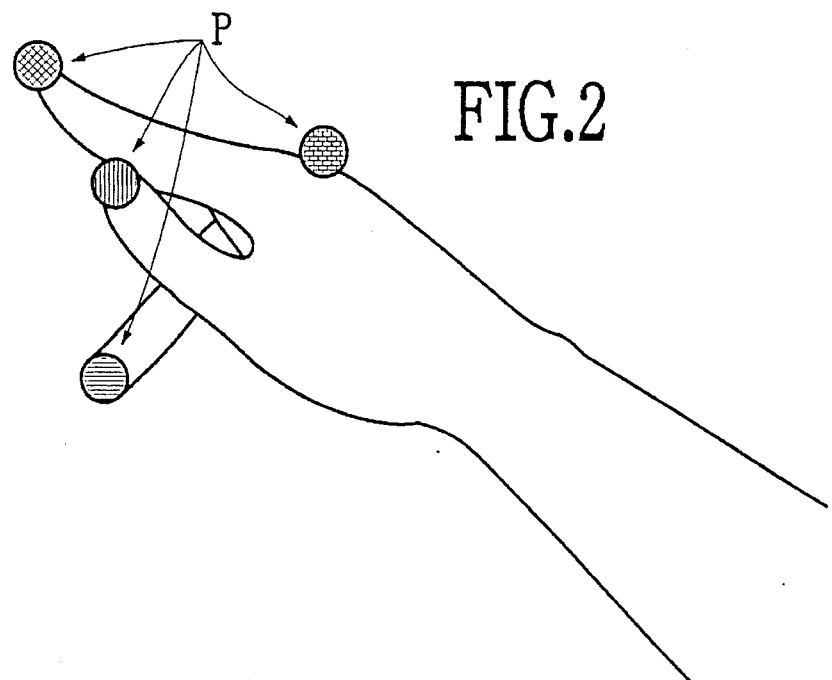
FIG. 2 is an illustration of an example of an operator operated object in a form of a glove used in the apparatus of FIG. 1.

The operator operated object can be provided in any suitable form including a part of the body of the operator such as a hand, or an instrument operated by a part of the body of the operator. For example, the object can be provided in a form of a glove to be worn by the hand of the operator as shown in FIG. 2 which incorporates easily recognizable feature points P to be extracted by the feature point extraction unit 2. The feature points can be provided in forms of marks colored with distinctive colors or marking articles in distinctive colors attached on a surface of the glove.

Figure 3:
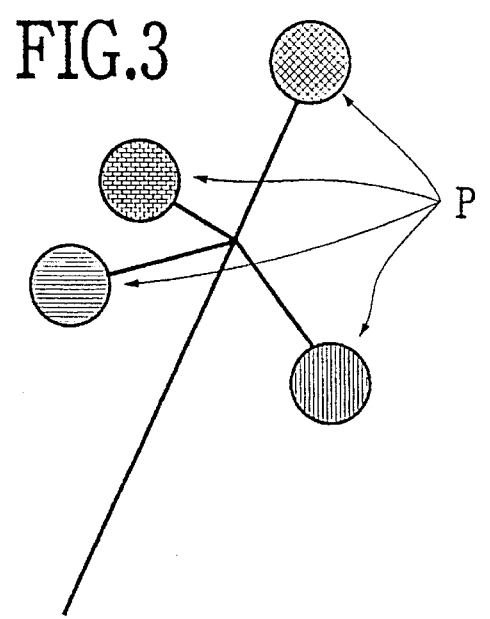
FIG. 3 is an illustration of another example of an operator operated object in a form of a stick used in the apparatus of FIG. 1.

Alternatively, the object can be provided in a form of a stick shaped instrument to be operated by the hand of the operator as shown in FIG. 3 which is equipped with four non-coplanar spheres of an identical shape colored in mutually different colors as the feature points P.

Figure 4:
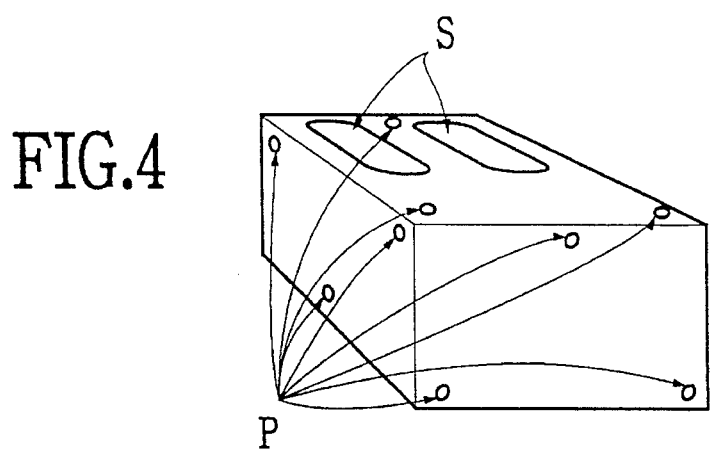
FIG. 4 is an illustration of another example of an operator operated object in a form of a mouse used in the apparatus of FIG. 1.

The object may also be provided in a form of a mouse like instrument to be operated by the hand of the operator as shown in FIG. 4, which is equipped with the feature points P in forms of LEDs arranged on a surface of a box shaped mouse body which emit lights of a distinctive color by using a built-in battery provided inside this mouse shaped instrument. This mouse shaped instrument of FIG. 4 is also equipped with switches S to be operated by the fingers of the operator at a time of grasping this instrument by hand, such that the LEDs do not emit lights while one of the switches S is depressed so that the instrument can be moved freely without specifying the commands while one of the switches S is depressed. In this first embodiment, the object such as the glove shown in FIG. 2 or the mouse shaped instrument shown in FIG. 4 is equipped with the feature points P such that at least four non-coplanar feature points P can be visible from any viewing direction.

The feature point extraction unit 2 extracts the feature points P from the time series image data supplied by the image input unit 1, by carrying out appropriate image processing on the image data, and outputs coordinate position data for each feature point P by tracing the motion of each feature point P to the pointing data generation means 4.

Here, in a case the operator operated object is a part of the body of the operator itself, the feature points P can be extracted as those points whose brightness largely differs from those of the neighboring picture elements in the image data.

In a case the operator operated object is a glove as shown in FIG. 2 or an instrument as shown in FIG. 3 in which the feature points P are marked by the distinctive colors, the color data for distinctive colors used for the feature points P to be extracted are memorized in advance, such that the image regions having the same colors as the memorized color data can be extracted from the image data and the center of mass coordinates of the extracted image regions can be outputted to the pointing data generation means 4 as the coordinate position data of the feature points P. In this case, the sizes of the extracted image regions can also be outputted to the pointing data generation means 4 as auxiliary data.

Here, the color data can be registered in a memory in advance, or learned by a prescribed learning procedure. For example, the image of the operator operated object obtained at the imaging means can be displayed by the image display unit 11 and the operator can be asked to specify which parts with the desired colors to be recognized, either by using a cursor provided on the image display unit 11, or by providing a window in superposition to the image of the operator operated object such that the operator manipulates the operator operated object to be placed within the window on the image display unit 11 and indicates a data input timing by a pressing of an appropriate key in response to which a color of the image region located within the window can be learned. When the colors on the images are expressed by three factors of a luminosity I, a hue H, and a saturation S, the learning of the colors can be achieved by using the following expressions:

$$H = h0 + h1 \cdot I + h2 \cdot I^2$$

$$S = s0 + s1 \cdot I + s2 \cdot I^2$$

where the coefficients h0. h1. h2. s0. s1, and s2 can be estimated by the least square estimation using the luminosity I given by the picture element value of the specified image region.

In a case the operator operated object is an instrument as shown in FIG. 4 in which the feature points P are indicated by the LEDs, the images can be binarized by using an appropriate threshold and the image regions with the luminosity over the threshold can be extracted from the image data, and then the center of mass coordinates of the extracted image regions can be outputted to the pointing data generation means 4 as the coordinate position data of the feature points P.

The pointing data generation unit 4 receives the time series coordinate position data for the feature points from the feature point extraction unit 2, and controls the affine flow analysis unit 3 to carry out the motion parameter analysis to be described in detail below according to the change of the feature point coordinate positions in at least two selected timings, so as to obtain the data necessary for controlling a motion of a pointer to be displayed on the image display unit 11.

Now, the motion parameter analysis to be carried out by the affine flow analysis unit 3 will be described in detail.

In the affine flow analysis unit 3, the coordinate positions of four feature points P in at least two images taken from the same camera position at separated timings are entered, and a relative motion of the camera (observer) which has taken the images of the object defined by these four feature points P is calculated. Here, the camera is assumed to be taken the images in the perspective projection as indicated in FIG. 5, in which a point on the object at a 3D spatial coordinate (X, Y, Z) is projected onto a point (x, y) on an image plane located at the X-Y plane, by the camera located at the focal distance f away from the image plane.

In this situation, suppose that the observer (camera) is in a translational motion with a linear velocity $\{U_1, U_2, U_3\}$ and a rotational motion with an angular velocity $\{\Omega_1, \Omega_2, 106_3\}$ with respect to the object, and let (u, v) be components of a moving velocity V(x, y) of the feature point (x, y) on the image plane, assuming that the feature point (x, y) is sufficiently close to the viewing direction. Then, these components (u, v) can be expressed in terms of the motion parameters of the observer as follows.

Namely, in this case, a 3D spatial coordinate (X, Y, Z) and velocity parameters $(X^1, Y^1, Z^1)$ have the relationship expressed by the following equation (1):

$$\begin{pmatrix} X^1 \\ Y^1 \\ Z^1 \end{pmatrix} = - \begin{pmatrix} \Omega_1 \\ \Omega_2 \\ \Omega_3 \end{pmatrix} \times \begin{pmatrix} X \\ Y \\ Z \end{pmatrix} - \begin{pmatrix} U_1 \\ U_2 \\ U_3 \end{pmatrix} \quad (1)$$

which can also be expressed as the following equations (2) to (4).

$$X^1 = \Omega_3 Y - \Omega_2 Z - U_1 \quad (2)$$

$$Y^1 = \Omega_1 Z - \Omega_3 X - U_2 \qquad (3)$$

$$Z^1 = \Omega_2 X - \Omega_1 Y - U_3 \qquad (4)$$

Then, when these expressions (2) to (4) are substituted into a projection relationship between a 3D spatial coordinate and the image plane coordinate expressed by the following equation (5):

$$x = \frac{fX}{Z} \qquad (5)$$

and its derivative expressed by the following equations (6) and (7):

$$u = \frac{fX^1}{Z} - \frac{fXZ^1}{Z^2} \qquad (6)$$

$$= \frac{fX^1 - XZ^1}{Z} \qquad (7)$$

the component u can be expressed by the following equations (8), (9), and (10).

$$u = \frac{f}{Z}(\Omega_3 Y - \Omega_2 Z - U_1) - \frac{x}{Z}(\Omega_2 X - \Omega_1 Y - U_3) \qquad (8)$$

$$= \frac{fU_1 - xU_3}{Z} - f\Omega_2 + \frac{fY}{Z}\Omega_3 x \frac{Y}{Z}\Omega_1 - x \frac{x}{Z}\Omega_2 \qquad (9)$$

$$= \left(\frac{fU_1 - xU_3}{Z}\right) + f\Omega_2 - y\Omega_3 - \frac{xy}{f}\Omega_1 + \frac{x^2}{f}\Omega_2 \qquad (10)$$

The similar calculation can also be made for the other component v, so the the component (u, v) can be expressed as the following set of equations (11).

$$u = \left(\frac{fU_1 - xU_3}{Z}\right) + f\Omega_2 - y\Omega_3 - \frac{xy}{f}\Omega_1 + \frac{x^2}{f}\Omega_2 \qquad (11)$$

$$v = \left(\frac{fU_2 - yU_3}{Z}\right) - f\Omega_1 + x\Omega_3 + \frac{xy}{f}\Omega_2 - \frac{y^2}{f}\Omega_1$$

Now, the moving velocity expressed by these components can be decomposed into a translational motion dependent component and a rotational motion dependent component. Of these, the rotational motion dependent component changes in accordance with the position of the picture element and is independent of the location or the shape of the object, so that, even though there is a method of solving the equation, unless there is a sufficient perspective projection effect, it is difficult to actually determine the rotational motion parameters as the change appearing on the image becomes too small. As a consequence, the change due to the rotational motion is introduced into the translational motion as an error, such that the accuracy of the calculation for the translational motion can also be affected. This is the reason why it has conventionally been difficult to calculate the shape and the motion of the object accurately.

On the other hand, assuming that two feature points are projected onto the same point on the image plane, it is possible to define a quantity called a motion parallax ($\Delta u$, $\Delta v$) as a difference between the moving velocities of these two feature points, which can be expressed by the following set of equations (12).

$$\Delta u = (fU_1 - xU_3)\left(\frac{1}{Z_1} - \frac{1}{Z_2}\right) \qquad (12)$$

$$\Delta v = (fU_2 - yU_3)\left(\frac{1}{Z_1} - \frac{1}{Z_2}\right)$$

This motion parallax depends only on the distance from the observer to the object and the translational motion of the observer, and is independent of the rotational motion of the observer.

In addition, the following equation (13) follows from the above set of equations (12):

$$\frac{\Delta u}{\Delta v} = \frac{(fU_1 - xU_3)}{(fU_2 - yU_3)} \qquad (13)$$

so that when x, y, and U3 are sufficiently small, the direction of the translational motion can be obtained from this motion parallax. When U3 is not small, the direction of the translational motion can be obtained from a ratio of U1 and U2 by solving this equation (13) with the motion parallaxes of a plurality of different coordinate points substituted into this equation (13).

Now, on the other hand, when the motion of the observer is sufficiently smooth and the surface of the object imaged by the observer is also sufficiently smooth, the velocity field expressed by the above set of equations (11) can be approximated by the linear equations within each small image region. Namely, in a vicinity of a coordinate point (x, y) on the image plane, the velocity field can be expressed in terms of the affine transformation (linear transformation) as in the following equation (14).

$$\begin{pmatrix} u \\ v \end{pmatrix} = \begin{pmatrix} u_0 \\ v_0 \end{pmatrix} + \begin{pmatrix} u_x & u_y \\ v_x & v_y \end{pmatrix} \begin{pmatrix} x \\ y \end{pmatrix} + O(x^2, xy, y^2) \qquad (14)$$

where $O(x^2, xy, y^2)$ denotes the quadratic non-linear components which can easily be affected by the noises and will be assumed to be ignorably small in the following. This corresponds to the approximation of the perspective projection by the weak perspective.

In this equation (14), the first term [$u_0$, $v_0$] on the right hand side represents the parallel displacement of the entire image, while the 2×2 tensor of the second term n the right hand side, in which a suffix of each element indicates the partial derivative with respect to the denoted parameter, contains the geometrical features including: the curl (curl V) representing a rotation on the image plane which indicates a change of an orientation as shown in FIG. 6A; the divergence (div V) representing an isotropic scale change as shown in FIG. 6B; the deformation (def V) representing a deformation for extending the image along a principal axis μ and contracting the image along another axis perpendicular to the principal axis while maintaining the area of the image as shown in FIG. 6C. Among these geometrical features, the curl V, div V, and def V are invariant features which do not depend on the coordinate system, whereas the principal axis μ depends only on the directions of the coordinate axes. These geometrical features can be expressed in terms of the partial derivatives of the moving velocity V as in the following equations (15) to (18).

$$div\ V = (u_x + v_y) \qquad (15)$$

$$curl\ V = -(u_y - v_x) \qquad (16)$$

$$(def\ V) \cos 2\mu = (u_x - v_y) \qquad (17)$$

$$(def\ V) \sin 2\mu = (u_y - v_x) \qquad (18)$$

Figure 7:
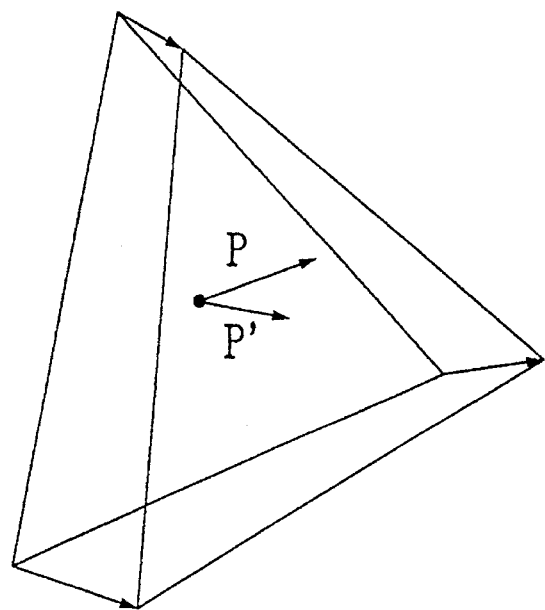
FIG. 7 is an illustration of a feature point and a virtual point used in the affine flow calculation to be carried out in the apparatus of FIG. 1.

Next, consider a particular feature point P on the image plane and three other feature points in a vicinity of this particular feature point P, as shown in FIG. 7 in which three other feature points are located at vertices of a triangular region surrounding this particular feature point P. As already mentioned above, in a sufficiently small image region, the velocity field on the image plane can be approximated by the affine transformation (linear transformation) for a region defined by the three other feature points.

At this point, consider a virtual point P' which is assumed to be located at the same coordinate position as this particular feature point P (i.e., projected onto the same point on the image plane as the particular feature point P), but which has the moving velocity determined by the affine transformation for the moving velocities of three other feature points, which may be different from the moving velocity of the particular feature point P as indicated by arrows in FIG. 7. In this case, the motion parallax of the particular feature point P and the virtual point P' indicates the difference of the motions between the actual feature point P and the virtual point P' which is projected onto the same point on the image plane but located at a different distance from the observer. In the following this motion parallax between the actual feature point P and the virtual point P' will be called a virtual parallax. Since the motion parallax depends only on the distance from the observer to the object and the translational motion of the observer, and is independent of the rotational motion of the observer, as already mentioned in conjunction with the set of equations (12) above, it is possible to calculate the stable motion parameters and the 3D structural information from the virtual parallax.

To show what kind of information can be obtained from this virtual parallax, the above described set of equations (11) for the moving velocity components can be substituted into the above described equation (14) for the affine transformation. Here, however, the object is assumed to be sufficiently far away from the observer, so that the change of the distance between the 3D coordinate points on the object surface is very small compared with the distance from the observer to the object. Therefore, denoting a distance from a center of the image to the object when the focal distance f is equal to 1 as $\lambda$, the change of the distance to the object surface can be expressed by the following equation (19):

$$Z = \frac{\lambda_x}{\lambda} x + \frac{\lambda_y}{\lambda} y + \lambda \tag{19}$$

such that Z is normalized by the parameter $\lambda$ for expressing the depth. With this convention, the parameters of the translational motion of the observer and the affine transformation can be expressed by the following equations (20) to (25).

$$u_0 = \frac{U_1}{\lambda} - \Omega_2 \tag{20}$$

$$v_0 = \frac{U_2}{\lambda} - \Omega_1 \tag{21}$$

$$u_x = \frac{U_1 \lambda_x}{\lambda^2} + \frac{U_3}{\lambda} \tag{22}$$

$$u_y = \frac{U_1 \lambda_y}{\lambda^2} - \Omega_3 \tag{23}$$

$$v_x = \frac{U_2 \lambda_x}{\lambda^2} - \Omega_3 \tag{24}$$

$$v_y = \frac{U_2 \lambda_y}{\lambda^2} + \frac{U_3}{\lambda} \tag{25}$$

When these expressions are substituted into the expressions for the invariant features given by the above described equations (15) to (18), the expressions given by the following equations (26) to (29) can be obtained.

$$\text{curl } V = -2 \Omega_3 + \frac{(-U_1 \lambda_y + U_2 \lambda_x)}{\lambda^2} \tag{26}$$

$$\text{div } V = 2 \frac{U_3}{\lambda} + \frac{(U_1 \lambda_x - U_2 \lambda_y)}{\lambda^2} \tag{27}$$

$$(\text{def } V) \cos 2\lambda = \frac{(U_1 \lambda_x - U_2 \lambda_y)}{\lambda^2} \tag{28}$$

$$(\text{def } V) \sin 2\lambda = \frac{(U_1 \lambda_y + U_2 \lambda_x)}{\lambda^2} \tag{29}$$

As can be seen from these equations (26) to (29), these invariant features depend on the motion of the observer, the depth, and the orientation of the surface.

Next, these expressions given by the equations (26) to (29) can be rewritten in the coordinate system independent forms by using two vectors F and A.

Namely, the vector A is defined as a translational velocity vector which is a projection of the 3D moving velocity on the image plane and normalized by the depth $\lambda$, as in the following equation (30):

$$\begin{aligned} A &= \left( \frac{U_1}{\lambda}, \frac{U_2}{\lambda} \right) \\ &= \frac{U - (U \cdot Q) Q}{\lambda} \end{aligned} \tag{30}$$

where U denotes the translational motion vector and Q denotes a unit vector in the viewing direction. On the other hand, the vector F is a 2D vector for indicating a direction of the maximum gradient on the object surface which is also normalized by the depth $\lambda$, as in the following equation (31).

$$\begin{aligned} F &= \left( \frac{\lambda_x}{\lambda}, \frac{\lambda_y}{\lambda} \right) \\ &= \frac{\text{grad } \lambda}{\lambda} \end{aligned} \tag{31}$$

Figure 8:
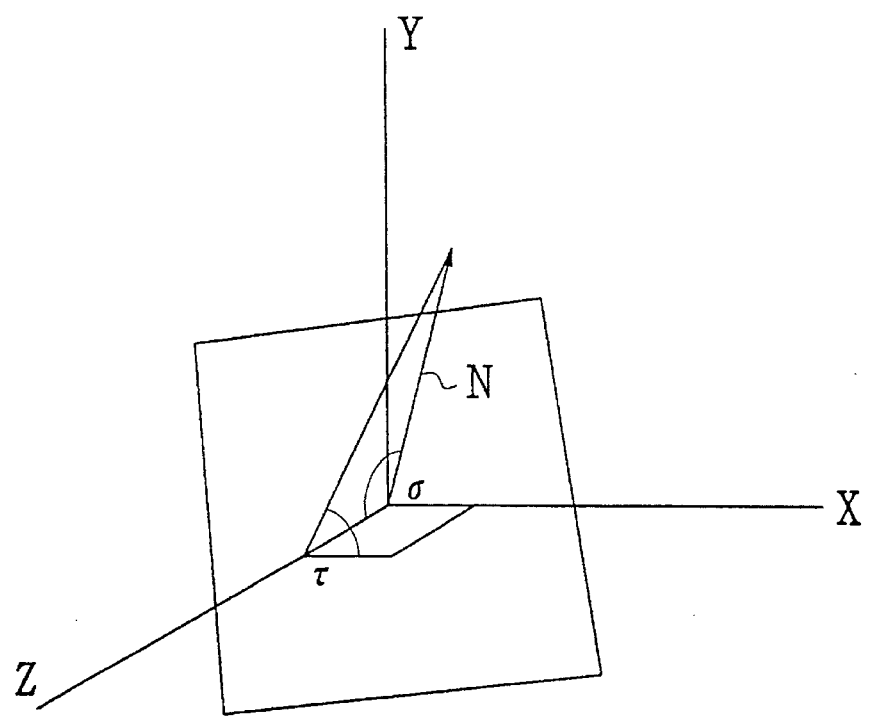
FIG. 8 is a diagram for explaining quantities to express a vector F used in the affine flow calculation to be carried out in the apparatus of FIG. 1.

Thus, as shown in FIG. 8, the magnitude of this vector F represents the tangent of a gradient $\sigma$ of the object surface, i.e., the tangent of an angle $\sigma$ between the viewing direction Z and a normal line N of the object surface, whereas the direction of this vector F represents an angle $\tau$ between the tangent plane of the object surface and the X axis. That is, the following two equations (32) and (33) hold for this vector F.

$$|F| = \tan \sigma \tag{32}$$

$$\theta_F = \tau \tag{33}$$

Then, in terms of these vectors A and F, the expressions for the invariant features given by the above equations (26) to (29) can be rewritten as the following equations (34) to (36).

$$\text{curl } V = -2 \, \Omega \cdot Q + |F \times A| \tag{34}$$

$$\text{div } V = \frac{2U \cdot Q}{\lambda} + F \cdot A \tag{35}$$

$$|\text{def } V| = |F||A| \tag{36}$$

In this case, the principal axis $\mu$ for the image deformation can be expressed as an angle passing through a middle of the two vectors A and F, as in the following equation (37).

$$\mu = \frac{\theta A + \theta F}{2} \tag{37}$$

Here, it is to be noted that the information expressed by these equations (34) to (37) contains the ambiguity due to the approximation of the perspective projection by the weak perspective already mentioned above in conjunction with the equation (14). For example, regarding the moving velocity, it is impossible to distinguish the observer motion corresponding to a small object moving nearby from the observer motion corresponding to a large object moving far away.

Because of such an ambiguity concerning the size and the velocity, it is more convenient to replace the velocity by a collision time tc representing a time at which the collision with the object occurs when the motion with the current moving velocity is continued, which can be defined by the following equation (38).

$$tc = \frac{\lambda}{U*Q} \tag{38}$$

It is also to be noted that the above equation (36) contains the ambiguity concerning the depth as it is impossible to distinguish a nearby object with not so well defined features from a distant object with well defined features, so that information of this equation (36) alone is not sufficient to distinguish the observer motion corresponding to an object with a small surface gradient (small |F|) and a large motion (large |A|) from the observer motion corresponding to an object with a large surface gradient (large |F|) and a small motion (small |A|).

By clearly separating the information which contains the ambiguity as such, it becomes possible in the present invention to obtain the other necessary information accurately, without being affected by the noises.

Now, the affine flow analysis unit 3 actually carries out the operation according to the flow chart of FIG. 9, as follows.

First, at the step ST101, three feature points among the four entered feature points are selected as reference points such that an area of a triangular region formed by joining these three feature points is going to be the largest among all the possible combinations, and the remaining one feature point is selected as a fiducial point.

Then, at the step ST102, the moving velocities of the three reference points are substituted into the equation (14), to obtain the linearly approximated affine transformation parameters $\{u_\emptyset, v_\emptyset, u_x, u_y, v_x, v_y\}$ for a region defined by the three reference points. Here, in a case of motion of the observer with respect to the object is small and smooth, these affine parameters can be obtained by using the least square method with respect to the position data for these three reference points in more than two frames of the images in order to improve the accuracy.

Next, at the step ST103, the virtual parallax between moving velocity of the fiducial point and the moving velocity of the virtual point determined according to the affine transformation calculated at the step ST102 is calculated. In this calculation, in a case it is possible to assume that the object is sufficiently far away from the observer and the translational motion $U_3$ in the viewing direction is not so large, the direction of the calculated virtual parallax can be taken as the direction $\theta_A$ of the vector A. Otherwise, the direction $\theta_A$ of the vector A is obtained as $\theta_A = \Delta u/\Delta v$ by substituting the virtual parallaxes for a plurality of points into the above equation (13).

Then, at the step ST104, the invariant features {curl, div, der} and the principal axis μ for the region defined by the three reference points are calculated by using the above equations (15) to (18). These invariant features are combination of the the change caused by the translational motion and the rotational motion of the observer with respect to the object and the change caused by the orientation of the object surface and the motion on the image plane.

Next, at the step ST105, the gradient of a plane defined by the three reference points is calculated by using the direction $\theta_A$ determined at the step ST103 and the principal axis μ determined at the step ST104 in the above equation (37).

Then, at the step ST106, using the results of the calculations above, a quantity $F \cdot A = |def\ V|\cos(\tau - \theta_A)$ is subtracted from the quantity given by the equation (35), in order to remove the change of the shape caused by the orientation of the object surface and the motion on the image plane. The remaining component represents the scale change of the image due to the motion of the observer with respect to the object along the viewing direction, so that the collision time tc is calculated from this remaining component.

Next, at the step ST107, using the results of the calculations above, a quantity $F \times A = |def\ V|\sin(\tau - \theta_A)$ is subtracted from the quantity given by the equation (34), in order to remove the false rotation due to the orientation of the object surface and the motion on the image plane. The remaining component represents the rotation around the viewing direction of the observer with respect to the object.

Finally, at the step ST108, the motion parameters for the observer that can be calculated stably from the image information, such as the translational motion direction indicated by $\theta_A$ which is perpendicular to the axis of rotation, the scale change indicated by tc, and the rotation around the viewing direction indicated by $\Omega \cdot U$, are calculated from the calculation results of the steps above, and outputted to the pointing data generation unit 4.

Figure 10:
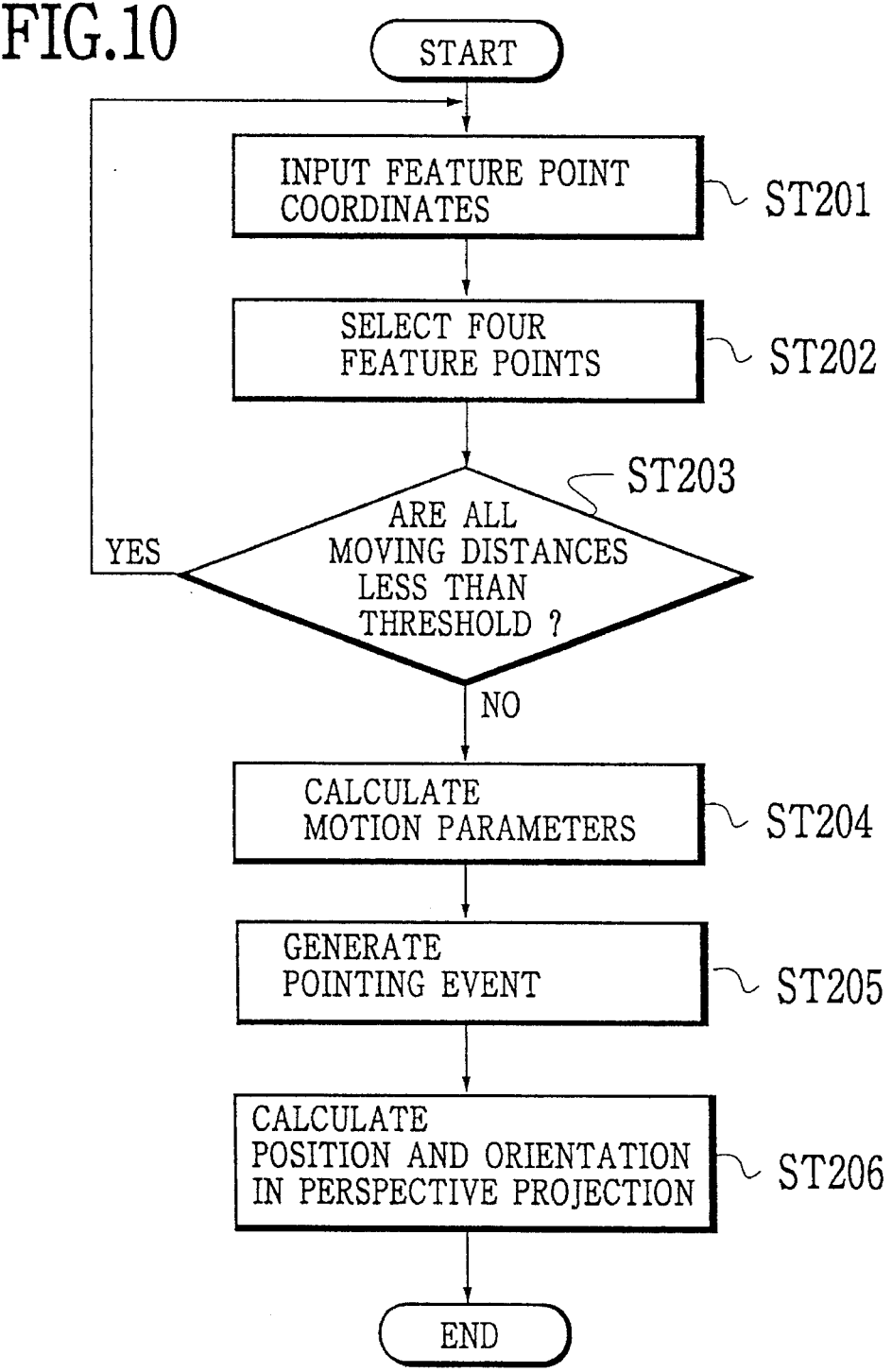
FIG. 10 is a flow chart for an operation of a pointing data generation unit in the apparatus of FIG. 1.

As already mentioned above, the pointing data generation unit 4 receives the time series coordinate position data for the feature points from the feature point extraction unit 2, and controls the affine flow analysis unit 3 to carry out the motion parameter analysis as described above, in order to obtain the data necessary for controlling a motion of a pointer to be displayed on the image display unit 11. This operation of the pointing data generation unit 4 is carried out according to the flow chart of FIG. 10, as follows.

First, at the step ST201, the feature point coordinates are entered from the feature point extraction unit 2 in forms of the time series coordinate position data. Here, when the auxiliary data are also present, these auxiliary data are also entered along with the coordinate position data. In general, there are m feature points (m is an integer) with coordinate $(x_i, y_i)$, i=1, 2, . . . , m.

At this point, as the imaging target object is actually moving, it is possible for some feature points that have been visible from the observer side to be hidden by the part of the object, or some feature points that have been hidden by the part of the object to be visible from the observer side.

For this reason, next at the step ST202, only four of the feature points $(x_i, y)$, i =1, 2, 3, 4, are selected from the common set of the feature points used in the previous pointing data generation and the feature points entered for the present pointing data generation, when the number of feature points visible from the observer side is greater than four. Here, the selection of the four feature points is made such that the selected four feature points are going to be evenly distributed over the object. In a case the number of feature points visible from the observer side is not greater than four, no operation is carried out at this step ST202.

Then, at the step ST203, using the current coordinates $(x_i, y_i)$ of the selected four feature points and the previous coordinates $(lx_i, ly_i)$ of these four feature points at a time of the previous pointing data generation, the moving distances $((x_i-lx_i)^2 + (y_i-ly_i)^2)$ are calculated for the selected four feature points, and each of the calculated moving distances is compared with a predetermined threshold. When all the calculated moving distances are less than the threshold, the process returns to the step ST201, whereas when there is at least one calculated moving distance which is greater than or equal to the threshold, the process proceeds to the following steps ST204 to ST206. Here, when the auxiliary data are also present, the threshold can be changed according to the auxiliary data. Also, when any of the selected four feature points has not been used for the pointing data generation previously, the current coordinate $(x_i, y_i)$ for such a feature point may be substituted for the previous coordinate $(lx_i, ly_i)$ in the calculation of the moving distances.

Figure 9:
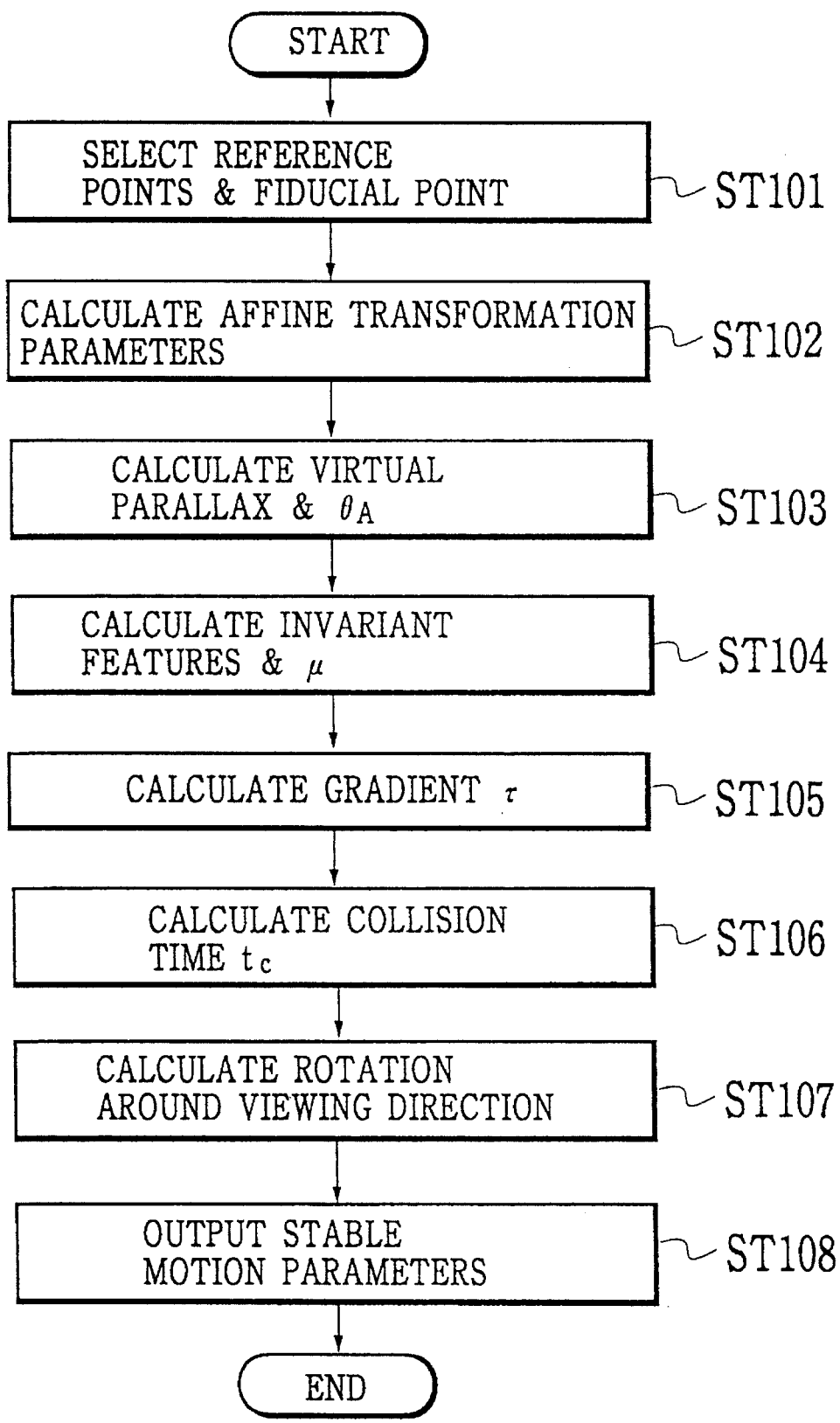
FIG. 9 is a flow chart for the affine flow calculation to be carried out in the apparatus of FIG. 1.

Then, at the step ST204, the current coordinates $(x_i, y_i)$ and the previous coordinates $(lx_i, ly_i)$ of the selected four feature points are supplied to the affine flow analysis unit 3 such that the affine floe analysis unit 3 carries out its operation to obtain the motion parameters according to the flow chart of FIG. 9 described above.

Here, the motion parameters calculated by the affine flow analysis unit 3 are based on the assumption that the object is static and the observer (camera) is moving, so that there is a need to convert these motion parameters to the motion parameters for the actual motion of the object. In this conversion, the motion of the center of mass given by $[u_\emptyset, v_\emptyset]$ is converted into the translational motion of the object in the X and Y directions, the collision time tc indicating the scale change is converted into the translational motion of the object in the Z direction, the quantity $\Omega \cdot U$ indicating the rotation around the viewing direction is converted into the rotational motion of the object around the Z axis, and the direction $\theta$ indicating the translational motion direction is converted into the rotational motion of the object around the X axis and the rotational motion of the object around the Y axis.

After this conversion, next at the step ST205, each of the motion parameters for the actual motion of the object is compared with a predetermined threshold, and for each motion parameter greater than the threshold, the pointing data generation unit 4 generates data called a pointing event for specifyng the motion of the pointer to be displayed on the image display unit 11, in accordance with a command indicated by the motion of the object specified by the motion parameter greater than the threshold. Here, a sign of the direction of the motion for the pointer specified in the pointing event is set to be such that the operator will recognize the direction of motion of the pointer displayed on the image display unit 11 to be in agreement with the direction of actual motion of the operator operated object. The pointing events generated by the pointing data generation unit 4 are supplied to the gesture pattern matching unit 6 and the pointer display unit 8.

Now, the motion parameters calculated by the affine flow analysis unit 3 include the parameters which cannot be calculated unless the perspective projection is assumed and which are expressed in terms of relative values using the depth $\lambda$, but there may be a case in which the absolute motion of the object becomes necessary. For this reason, at the step ST206, the pointing data generation unit 4 calculates the position and the orientation of the object in the perspective projection by substituting the parameters expressed in terms of relative values using the depth $\lambda$ into the above equation (11) for the perspective projection, and supplies these data on the position and the orientation in the perspective projection to the pointer display unit 8 along with the pointing events. This calculation can be done in any known manner for solving the equations for 3D coordinates and the coordinates on the perspective projection images of the object. In a case the absolute motion of the object is unnecessary, this step ST206 can be omitted.

Figure 11:
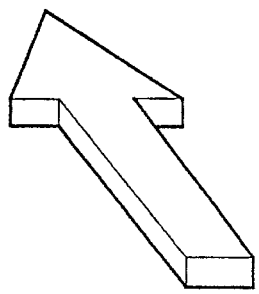
FIG. 11 is an illustration of a pointer model used in the apparatus of FIG. 1.

The pointer display unit 8 is controlled by the status switching unit 5 to select either one of a pointer model for the pointer to be displayed as shown in FIG. 11 which is capable of indicating the 3D orientation in an easily comprehensible manner and stored in the pointer model memory unit 12, or a desired one of the 3D models for the images to be displayed which is stored in the 3D model memory unit 9 and specified from the status switching unit 5, and to generate the graphics image data for the selected one of the pointer model and the 3D models in the position and orientation resulting from the application of the translational and rotational motions according to the pointing events supplied from the pointing data generation unit 4 to the current position and orientation of the selected one of the pointer model and the 3D models, which are to be supplied to the image composition unit 10.

The pointer model memory unit 12 stores the pointer model for the pointer of FIG. 11 along with its current position and orientation, while the 3D model memory unit 9 stores the 3D models for the images to be displayed along with their current positions and orientations.

The gesture pattern matching unit 6 compares a continuous gesture pattern given by a time series sequence of the latest pointing event supplied from the pointing data generation unit 4 which is not interrupted by the keyboard input by the operator, with each of the gesture patterns stored in the gesture pattern memory unit 7, in order to judge whether the gesture pattern specified by the latest pointing event is one of the significant gesture patterns for particular command inputs which are registered in the gesture pattern memory unit 7 in advance along with the operations to be executed specified by these significant gesture patterns. In a case the matching of the latest gesture pattern with one of the significant gesture patterns is found, the operation specified by the particular command input represented by that significant gesture pattern is executed.

Figure 12:
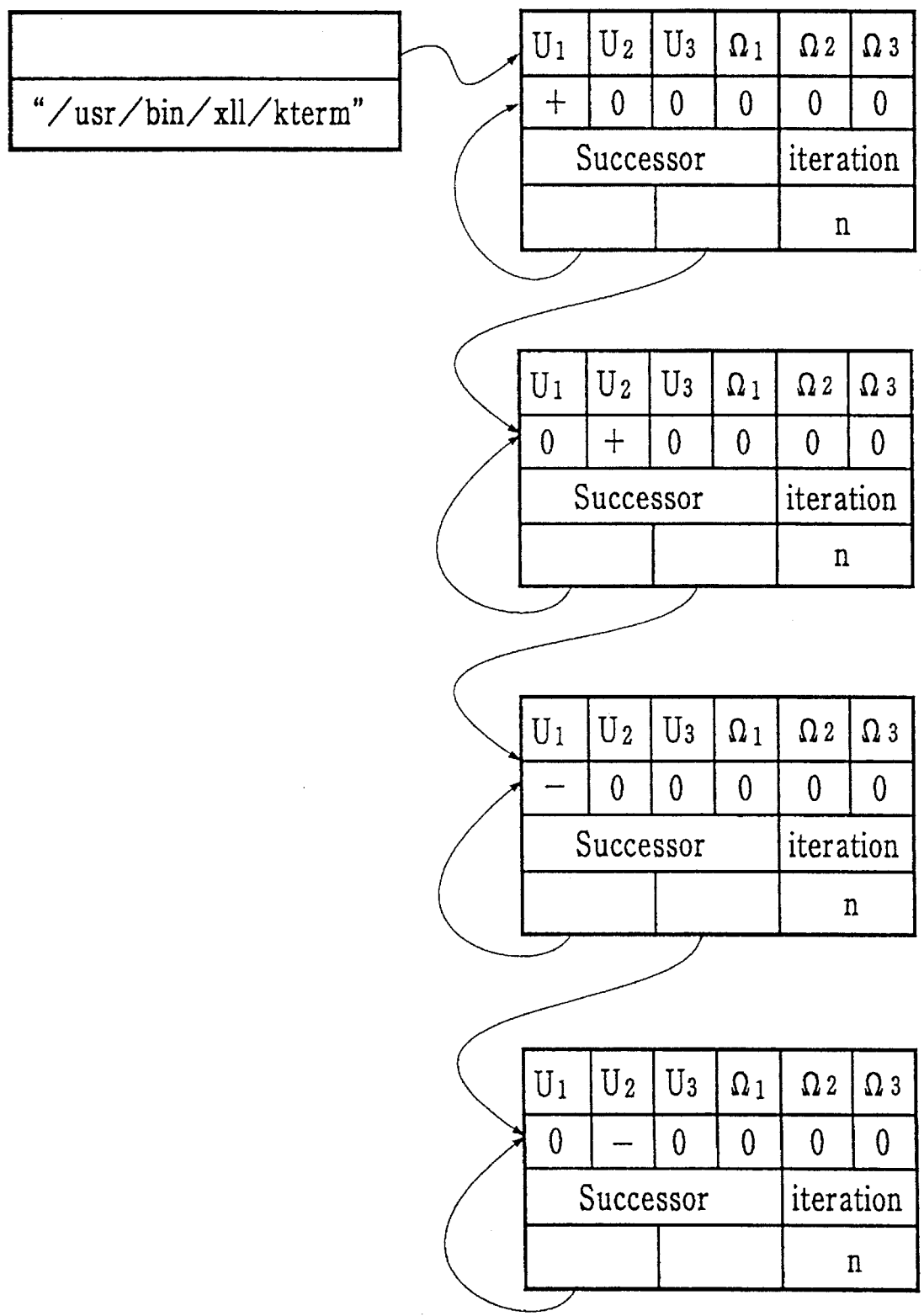
FIG. 12 is a diagrammatic illustration of the gesture pattern used in the apparatus of FIG. 1.

The gesture pattern memory unit 7 stores each gesture pattern in a form of a list structure as shown in FIG. 12, which includes a letter series expressing the operation to be executed as in the left half of FIG. 12 and a list of tables expressing the pointing events constituting the gesture as in the right half of FIG. 12. Each pointing event is specified in terms of three translational motion parameters $\{U_1, U_2, U_3\}$ and three rotational motion parameters $\{\Omega_1, \Omega_2, \Omega_3\}$, each of which is given a symbol "+" or "−" for indicating a presence of a prescribed unit of the motion related to each motion parameter in the positive or negative direction, or a symbol "0" for indicating an absence of the motion related to each motion parameter. Each table also contains two "successor" slots for pointing the tables for the next pointing events to be processed from each pointing event. Here, the "Successor" may point back to its own table in order to indicate a closed loop for iterating the same pointing evenets. A number of iterations in the closed loop is also specified in each table by a number "n" indicated in an "iteration" slot. The gesture pattern shown in FIG. 12 indicates the operation "/usr/bin/xll/kterm" executed in response to a gesture of tracing along a square of an arbitrary size.

The status switching unit 5 stores a current pointer state as either one of a pointer manipulating state in which the pointer displayed on the image display unit 11 is freely manipulated within a 3D space displayed by the image display unit 11, or a model handling state in which the position and orientation of one of the 3D models displayed on the image display unit 11 and selected by the pointing of the pointer are changed, and switches the pointer state in accordance with the command from the operator or the pointer display unit 8.

In the pointer manipulating state, the status switching unit 5 controls the pointer display unit 8 to selects the pointer model stored in the pointer model memory unit 12, and changes the position and orientation of the pointer displayed on the image display unit 11 according to the pointing events generated by the pointing data generation unit 4. The generated pointing events are also supplied to the gesture pattern matching unit 6 in order to recognize the occurrence of the significant gesture patterns in the series of events. In a case the significant gesture pattern is recognized in the series of events, the operation corresponding to the recognized significant gesture pattern is executed. When the keyboard input or the command by the gesture made by the operator a 3D position of one of the 3D models stored in the 3D model memory unit 9, the status switching unit 5 switches the pointer state to the model handling state.

In the model handling state, one of the 3D models stored in the 3D model memory unit 9 and specified by using the pointer in the pointer manipulating state is displayed on the image display unit 11 in the newly specified position and orientation. More specifically, as the pointer state is switched to the model handling state, the specified 3D model is read out from the 3D model memory unit 9 and transmitted to the pointer display unit 8 at which the graphics data specifying the position, orientation, shape and a color of the specified 3D model are generated and supplied to the image composition unit 10, such that the specified 3D model can be displayed on the image display unit 11 in the specified position, orientation, shape, and a distinctive color which distinguishes the specified 3D model from the other 3D models. Here, at the pointer display unit 8, the data on the position and orientation in the perspective projection obtained at the pointing data generation unit 4 may be utilized in accounting for the translation and the rotation of the 3D model rather than the pointing events.

Figure 13:
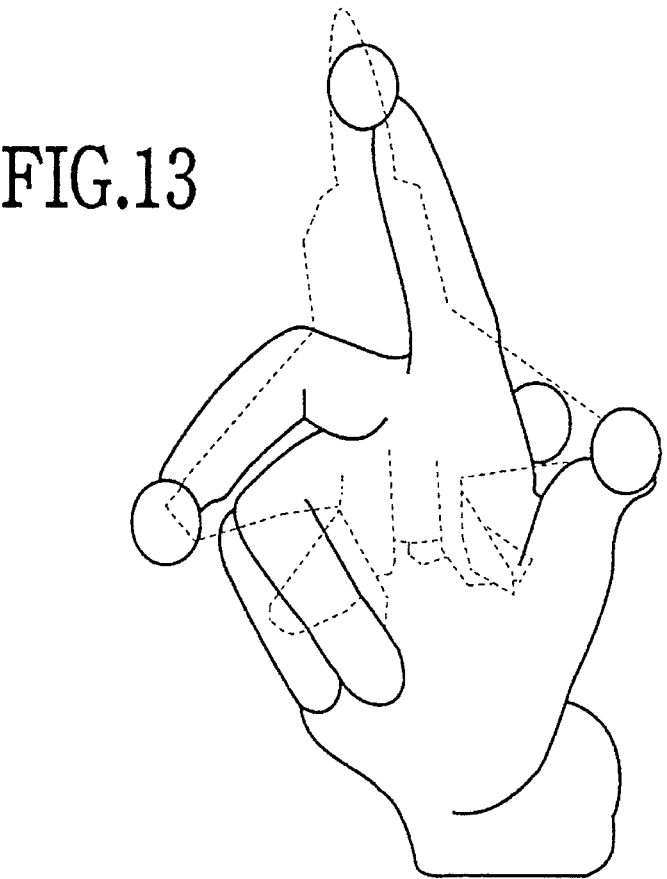
FIG. 13 is an illustration of an exemplary display of an operator operated object and a 3D model obtained by the apparatus of FIG. 1.

At the image composition unit 10, the graphics data for the specified 3D model is composed with the input image supplied from the image input unit 1, such that the image display unit 11 can display the composed image such as a hand grasping the 3D model as shown in FIG. 13 or the 3D model attached on the operator operated object in a form of a pointing instrument for example.

More specifically, the image composition unit 10 extracts the closed image region surrounding the feature points from the image data supplied from the image input unit 1, so as to cut out the region showing the operator operated object such as a hand or an instrument. Then, a mirror image of the extracted image region is obtained in order to match the displayed motion direction observed by the operator on the image display unit 11 with the actual motion direction observed by the operator in the real space. Then, according to the data on the position, orientation, and shape of the specified 3D model and the coordinate position data for the feature points on the operator operated object, the appropriate processing such as the parallel displacement and the scale change are applied to the input image, so as to place the positions of the feature points at appropriate points on the 3D model such as its vertices, Then, the graphics data for the 3D model and the input image of the operator operated object are superposed in a manner of the semi-transparent superposition, such that the image display unit 11 can display the composed image such as a hand grasping the 3D model as shown in FIG. 13 for example.

Thus, in this first embodiment, it is possible to realize a 3D human interface apparatus using a motion recognition based on a dynamic image processing in which the motion of an operator operated object as an imaging target can be recognized accurately and stably, without being influenced by the ambiguity associated with the perspective projection.

Figure 14:
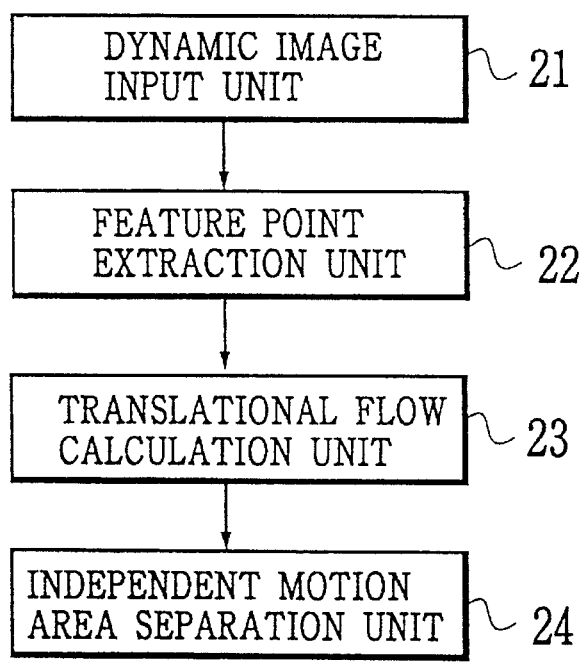
FIG. 14 is a schematic block diagram of a second embodiment of a 3D human interface apparatus according to the present invention.

Referring now to FIG. 14, a second embodiment of a 3D human interface apparatus using a motion recognition based on a dynamic image processing according to the present invention will be described in detail.

This second embodiment concerns with a mechanism for separating a moving object from a background, which can be utilized for detecting an operator operated object in the first embodiment of the 3D human interface apparatus described above.

As shown in FIG. 14, this second embodiment comprises a dynamic image input unit 21, a feature point extraction unit 22 connected with the dynamic image input unit 21, a translational flow calculation unit 23 connected with the feature point extraction unit 22, and an independent motion area separation unit 24 connected with the translational flow calculation unit 23, each of which will now be described in detail.

The dynamic image input unit 21 has an imaging means such as a video camera for imaging dynamic images while carrying out an unknown motion in a 3D space, and supplies the obtained dynamic image data to the feature point extraction unit 22. The imaging environment for this imaging operation by the dynamic image input unit 21 is a basically static environment, which may contain some moving objects.

The feature point extraction unit 22 extracts the feature points from the time series dynamic image data received from the dynamic image input unit 21 by carrying out an appropriate image processing on the image data, and supplies the obtained feature points to the translational flow calculation unit 23. Here, a large number of the feature points are extracted as those points each of which can be identified as the projections of the same point in two images and whose brightness or color largely differs from those of the neighboring picture elements in each image.

The translational flow calculation unit 23 constructs sets of four nearest neighbor feature points according to the coordinates of the entered feature points, and carries out the affine flow calculation similar to that carried out by the affine flow analysis unit 3 of the first embodiment described above by which the virtual parallax is obtained and the motion parameters of the observer (camera) are calculated, for each one of the sets of four nearest neighbor feature points constructed.

Here, it is noted that, among the motion parameters calculated by this affine flow calculation, the translational motion direction $\theta_A$ indicates the direction in which the observer (camera) is translationally moving with respect to the imaging environment, so that when the imaging environment is a totally basically static one, it should take the same value for any one of the sets of four nearest neighbor feature points. Actually, in this affine flow calculation, the central projection is approximated by the affine transformation within a limited view field, so that the same value can be obtained for this translational motion direction $\theta_A$ only for a set of mutually close feature points.

This implies that when the imaging environment contains a moving object, all the sets of four nearest neighbor feature points located on the moving object take a value of this translational motion direction $\theta_A$ which is uniform over this moving object as well as distinct from the value of this translational motion direction $\theta_A$ for the background surrounding this moving object. Consequently, when the values of the translational motion direction $\theta_A$ for all the sets of four nearest neighbor feature points distributed over the entire image field are plotted in a form of a distribution plot given in terms of arrows indicating the values of the translational motion direction $\theta_A$ as shown in FIG. 15, it becomes possible to distinguish the moving object from the background by separating the area having a uniform and distinct value of the translational motion direction $\theta_A$.

Figure 15:
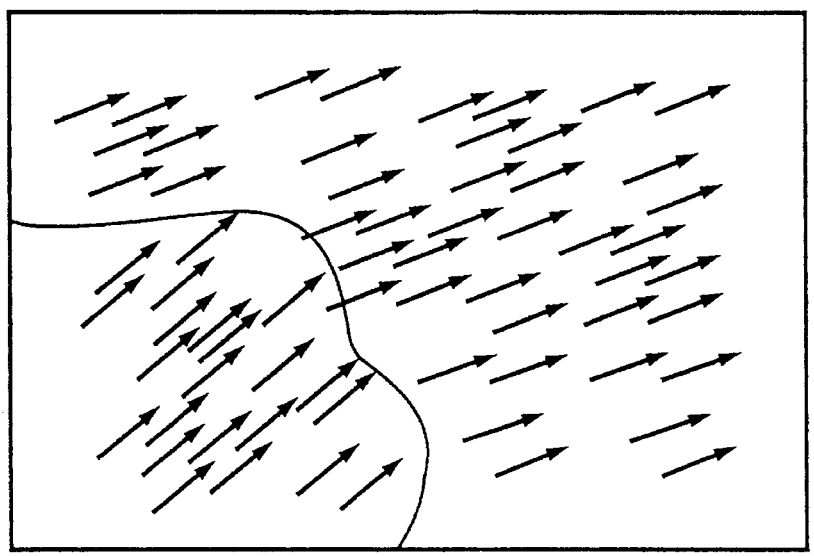
FIG. 15 is an illustration of a distribution plot for the translational motion direction used in the apparatus of FIG. 14.

To this end, the translational flow calculation unit 23 produces the distribution plot for the translational motion direction $\theta_A$ as shown in FIG. 15 and supplies this distribution plot to the independent motion area separation unit 24.

The independent motion area separation unit 24 compares the values of the translational motion direction $\theta_A$ for each adjacent sets of four nearest neighbor feature points and produces a separation border between those adjacent sets of four nearest neighbor feature points for which the difference in the values of the translational motion direction $\theta_A$ is greater than a prescribed threshold. In this manner, an area corresponding to the moving object can be separated from the background as in the area enclosed by a solid line in FIG. 15.

The independent motion area separation unit 24 also obtains the motion parameters of the observer (camera) other than the translational motion direction $\theta_A$ from the affine flow calculation results obtained at the translational flow calculation unit 23 for the separated background area.

Thus, according to this second embodiment, it becomes possible to provide a mechanism for separating a moving object from the background, which can be utilized in detecting an operator operated object in the first embodiment of the 3D human interface apparatus described above when the location of the operator operated object is not known beforehand.

Figure 16:
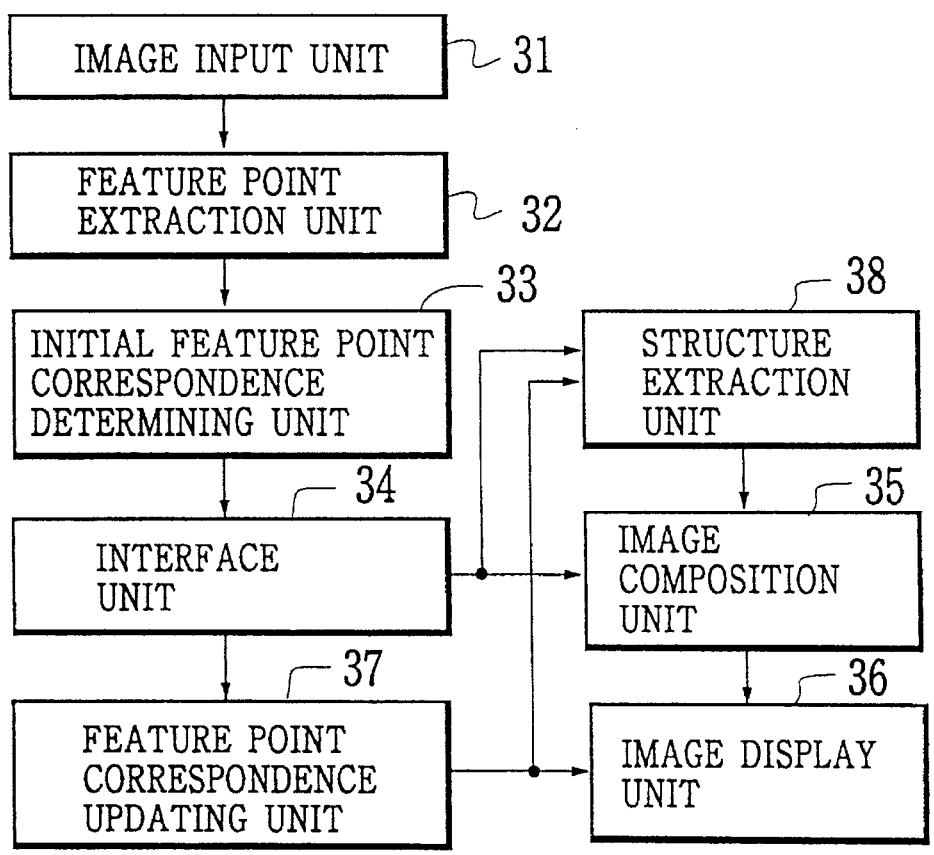
FIG. 16 is a schematic block diagram of a third embodiment of a 3D human interface apparatus according to the present invention.

Referring now to FIG. 16, a third embodiment of a 3D human interface apparatus using a motion recognition based on a dynamic image processing according to the present invention will be described in detail.

This third embodiment concerns with a mechanism for changing the viewpoint of the displayed image of an imaging target object of an unknown shape by using the structure of the imaging target object, which can be utilized in displaying the operator operated object in the first embodiment of the 3D human interface apparatus described above.

As shown in FIG. 16, this third embodiment comprises an image input unit 31, a feature point extraction unit 32 connected with the image input unit 31, an initial feature point correspondence determining unit 33 connected with the feature point extraction unit 32, an interface unit 34 connected with the initial feature point correspondence determining unit 33, an image composition unit 35 connected with the interface unit 34, an image display unit 36 connected with the image composition unit 35, a feature point correspondence updating unit 37 connected with the interface unit 34 and the image display unit 36, and a structure extraction unit 38 connected with the interface unit 34, the image composition unit 35, and the feature point correspondence updating unit 37, each of which will now be described in detail.

The image input unit 31 has an imaging means such as a video camera for taking a plurality of input images of an imaging target object such as an operator operated object used in the first embodiment described above, from a plurality of directions, and supplies the image data for these input images to the feature point extraction unit 32. Here, the input images are not necessarily continuous in time, and the positional relationship between the imaging target object and the observer (camera) at a time of image taking is unknown.

The feature point extraction unit 32 extracts the feature points from each of the input images supplied from the image input unit 31 by carrying out an appropriate image processing on the image data, and supplies the obtained feature points to the initial feature point correspondence determining unit 33. Here, a large number of the feature points are extracted as those points whose brightness or color largely differs from those of the neighboring picture elements in each input image. The extracted feature points are displayed on the image display unit 36 in superposition to the input images taken by the image input unit 31.

The initial feature point correspondence determining unit 33 compares the feature points on a plurality of input images to determine those feature points which are projections of the same point on the imaging target object. To this end, each one of the feature points supplied from the feature point extraction unit 32 is initially attached with a non-correspondence flag indicating a non-corresponding state. Then, the correlational matching is made for a small region centered around each feature point between the different input images, and the correspondence is established between those feature points on the different input images for which the correlation coefficient resulting from the correlational matching is greater than a prescribed threshold. Each one of those feature points between which the correspondence is established in this manner is attached with a correspondence flag indicating a corresponding state.

The feature point set data representing the feature points attached with either the non-correspondence flags or the correspondence flags obtained at this initial feature point correspondence determining unit 33 are then supplied from the initial feature point correspondence determining unit 33 to the feature point correspondence updating unit 37 through the interface unit 34. Also, in accordance with the initial correspondences determined by this initial feature point correspondence determining unit 33, the display of the feature points on the image display unit 36 are modified such that the feature points attached with the correspondence flags can be distinguished from the feature points attached with the non-correspondence flags, by changing their colors for example. Also, the feature points are displayed on the image display unit 36 in such a manner that it is possible to recognize which feature point on one input image corresponds to which feature point on another input image.

The interface unit 34 receives the feature point set data from the initial feature point correspondence determining unit 33 and carries out the correction operation to correct the initial correspondences among the feature points. In a case the initial correspondences are sufficiently accurate, this correction operation may be skipped.

To this end, the interface unit 34 superposes a cursor controlled by a pointing device such as a mouse operated by the operator, on the display of the input image and the feature points on the image display unit 36, by means of which the operator can select a desired one of the displayed feature point. Then, when the operator selects the feature point with the correspondence flag, the correspondence flags attached to the selected feature point and its corresponding feature points on the other input images are replaced by the non-correspondence flags, so as to cancel the established correspondence. On the other hand, when the operator selects a series of feature points with non-correspondence flags in a plurality of the input images successively, the non-correspondence flags attached to the selected feature points are replaced by the correspondence flags, so as to establish a new correspondence. In addition, when the operator selects a series of picture elements without feature points in a plurality of the input images successively, new feature points are generated at the selected picture elements and the correspondence flags are attached to these new feature points.

In addition, the interface unit 34 also provides call up buttons for the correspondence updating, the structure extraction, and the image composition, which can be selected by using the cursor. Then, when the operator selects the call up button for the correspondence updating, the feature point set data are supplied to the feature point correspondence updating unit 37 to carry out the correspondence updating operation to be described below. When the operator selects the call up button for the structure extraction, the feature point set data are supplied to the structure extraction unit 38 to carry out the 3D structure extraction operation to be described below. When the operator selects the call up button for the image composition, the operator is inquired as to the desired viewpoint of the display, and in response the operator enters the translational and rotational motion vectors for shifting the viewpoint to the desired viewpoint. Then, the interface unit 34 supplies the input images, the feature point set data, and the entered motion vectors to the image composition unit 35, at which the input images and the feature points are composed with a 3D model representing the structure of the imaging target object obtained by the structure extraction unit 38, and the composed images are displayed on the image display unit 36.

The image display unit 36 displays the composed image viewed from the desired viewpoint which is produced by the image composition unit 35 from the input images, the feature points, and the 3D model representing the structure of the imaging target object obtained by the structure extraction unit 38, along with the cursor specified from the interface unit 34.

The feature point correspondence updating unit 37 receives the feature point set data from the interface unit 34, and carries out the following correspondence establishing operation for the feature points with the non-correspondence flags.

First, among the received feature point set data, a feature point A0 attached with a correspondence flag is selected, and a feature point B attached with a non-correspondence flag which is located in a vicinity of the feature point A0 is also selected, on a particular input image.

Then, a feature point B' located in a vicinity of a feature point A0' on a different input image which is corresponding to the feature point A0 is compared with the feature point B, to see if these feature points B and B' corresponds with each other.

Here, in a case there are at most two feature points with the correspondence flags in a vicinity of these feature points B and B', the comparison is made by the correlational matching for the small region centered around each feature point between these two input images by using the threshold lower than that used in the initial feature point correspondence determining unit 33.

Figure 17:
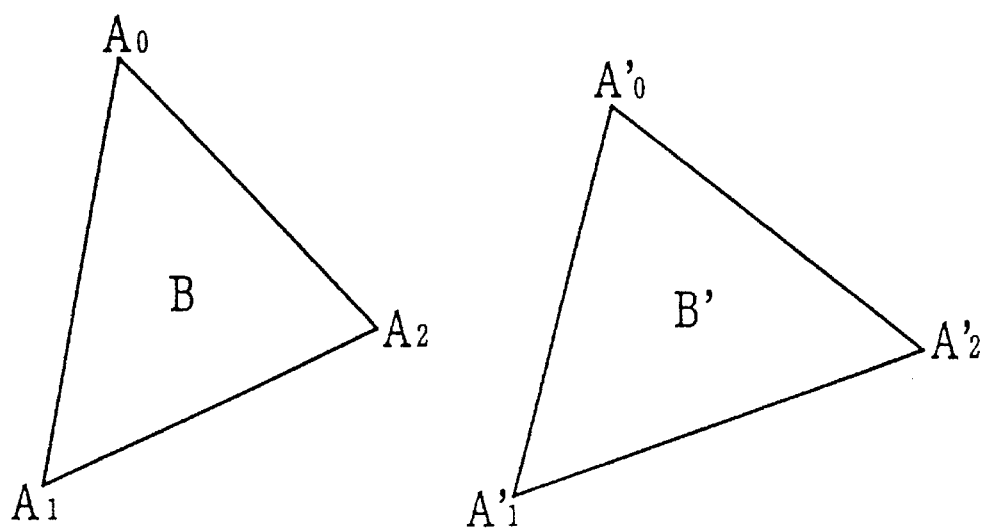
FIG. 17 is an illustration of two sets of nearest neighbor feature points used in updating the feature point correspondences in the apparatus of FIG. 16.

On the other hand, in a case there are at least three feature points with the correspondence flags in a vicinity of these feature points B and B' as shown in FIG. 17, the comparison is made by the correlational matching which accounts for the deformation of the image. Namely, the affine transformation to transform a triangle A0, A1, A2 into a triangle A0', A1', A2' is calculated first. Then, the small region centered around the feature point B is deformed by the calculated arline transformation, and the correlational matching is carried out between the deformed small region centered around the feature point B and the small region centered around the feature point B', by using the same threshold lower than that used in the initial feature point correspondence determining unit 33.

Then, each one of those feature points between which the correspondence is established in these manners is attached with the correspondence flag indicating a corresponding state. This correspondence establishing operation is repeated until the correspondences are established for all the feature points of the received feature point set data.

The structure extraction unit 38 receives the plurality of input images obtained by imaging the imaging target object of an unknown shape and the feature point set data from the interface unit 34, and obtains the 3D model representing the structure of the imaging target object and the texture data representing the surface texture of the imaging target object as follows.

First, each set of four nearest neighbor feature points is extracted from the feature point set data, and the affine flow calculation similar to that carried out by the affine flow analysis unit 3 of the first embodiment described above is carried out to calculate the motion parameters of the observer (camera).

Now, the four feature points are divided into three reference feature points forming a triangle and one fiducial feature point P as in FIG. 7 described above, and a virtual point P' associated with the fiducial feature point P is considered. In this case, the virtual point P' represents a point which is located at the same coordinate as the fiducial feature point P in one input image, but which is moved by the affine transformation determined by the motions of the three reference points in another input image. In other words, this virtual point P' represents a point located on a plane defined by the three reference points in the 3D space, which is projected onto the same point on the image plane. For these fiducial feature point P and the virtual point P', the size of the virtual parallax PP' (i.e., motion parallax between the fiducial feature point P and the virtual point P') can be expressed by the following equation (39) in accordance with the set of equations (12) described above.

$$\Delta u^2 + \Delta v^2 = \left( \frac{1}{Z_P} - \frac{1}{Z_{P'}} \right) ((fU_1 - xU_3)^2 + (fU_2 - yU_3)^2) \qquad (39)$$

Figure 18:
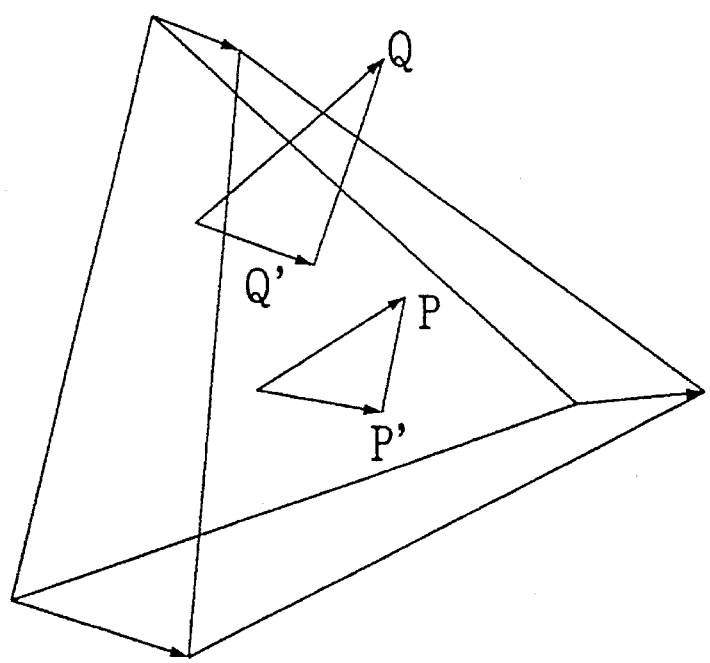
FIG. 18 is an illustration of a feature point and a virtual point used in the affine flow calculation to be carried out in the apparatus of FIG. 16.

Now, a situation in which another feature point Q is added in a vicinity of these four feature points as shown in FIG. 18 is considered. This point Q is also associated with the virtual point Q' similar to the virtual point P', which is a point which moves by the arline transformation determined by the motions of the three reference points and located on a plane defined by the three reference points in the 3D space. In this situation, as the feature points P and Q are close to each other while the imaging target object is sufficiently far away from the observer, a ratio of the sizes of two virtual parallaxes PP' and QQ' can be expressed as $(Z_P - Z_{P'})/(Z_Q - Z_{Q'})$, from which a ratio of the coordinates in the depth direction with respect to a plane on which the feature points P and Q are located can be obtained.

The structure extraction unit 38 carries out this calculation of the ratio of the sizes of two virtual parallaxes for each set of four nearest neighbor feature points, to produce the 3D model of the imaging target object in which the length in the depth direction of the imaging target object is expressed in terms of a ratio with respect to a certain length $\lambda$. Then, the complete 3D model is obtained either by graphically displaying this 3D model on the image display unit 36 and allowing the operator to specify the value of $\lambda$ while watching the displayed 3D model, or by estimating an appropriate value of $\lambda$ to be such a value that an intersection angle at an intersection of planes present in the 3D model surface becomes the right angle.

In addition, once the value of $\lambda$ is determined, the gradient of a triangular object surface region enclosed by the three reference feature points on the input image can be calculated according to the equation (31) described above, from which the texture data representing the surface texture of the imaging target object can be obtained.

The structure extraction unit 38 outputs the 3D model and the texture data obtained in these manners to the image composition unit 35.

The image composition unit 35 deforms the input images by using the 3D structure represented by the 3D model entered from the structure extraction unit 38 and the motion parameters specifying the desired viewpoint supplied from the interface unit 34, and composes the image viewed from the desired viewpoint. Here, the deformation of the input images due to the motion of the observer can be expressed by the translational motion vector and the rotational motion vector of the observer, the gradient of the object surface, and the translational motion on the image plane, according to the equations (34) to (36) described above. The motion of the observer and the translational motion on the image plane are calculated from the motion vectors to shift the viewpoint to the desired viewpoint, and the gradient of the object surface are obtained from the 3D structure of the imaging target object, so that it is possible to calculate the affine transformation matrix expressing the deformation of the input images due to the shifting of the viewpoint.

In order to obtain the composed image, in the image composition unit 35, each region of the input images in which the imaging target object is present is divided into triangular patches defined by the lines joining the feature points within the region. Then, for each triangular patch, the affine transformation calculated above is applied to obtain a new triangular patch, and the obtained new triangular patches are put together to form the image of the imaging target object viewed from the new viewpoint to be displayed on the image display unit 36.

Thus, according to this third embodiment, it becomes possible to provide a mechanism for changing the viewpoint of the displayed image of an imaging target object of an unknown shape by using the structure of the imaging target object, which can be utilized in displaying the operator operated object in the first embodiment of the 3D human interface apparatus described above when the shape of the operator operated object is not known beforehand.

It is to be noted here that many modifications and variations of the above embodiments may be made without departing from the novel and advantageous features of the present invention. Accordingly, all such modifications and variations are intended to be included within the scope of the appended claims.

What is claimed is:

1. A 3D human interface apparatus for facilitating 3D pointing and controlling command inputs by an operator, comprising:

image input means for entering a plurality of time series images of an object operated by the operator into a motion representing a command;

feature point extraction means for extracting at least four feature points including at least three reference feature points and one fiducial feature point on the object, from each of said images;

motion recognition means for recognizing the motion of the object by calculating motion parameters, according to an arline transformation determined from changes of positions of the reference feature points on said images, and a virtual parallax for the fiducial feature point expressing a difference between an actual position change on said images and a virtual position change according to the affine transformation; and command input means for inputting the command indicated by the motion of the object recognized by the motion recognition means.

2. The apparatus of claim 1, wherein the motion recognition means calculates the motion parameters for a relative motion of an observer taking said images with respect to the object, according to the affine transformation which represents the relative motion.

3. The apparatus of claim 2, wherein the motion recognition means calculates the motion parameters by eliminating factors not due to the motion of the object from invariant features derived from the affine transformation.

4. The apparatus of claim 3, wherein the motion recognition means eliminates the factors not due to the motion of the object which are obtained by using a translational motion direction on said images determined from the virtual parallax.

5. The apparatus of claim 1, wherein the feature point extraction means also extracts a multiplicity of feature points distributed over an entire imaging field of said images, and which further comprises:

object detection means for detecting the object in said images by calculating translational motion directions on said images for said multiplicity of feature points, plotting a distribution plot of the translational motion directions over the entire imaging field, and separating an area having identical and distinctive translational motion directions distributed therein in the distribution plot as the object.

6. The apparatus of claim 5, wherein the object detection means calculates the translational motion directions according to virtual parallaxes for said multiplicity of feature points, each virtual parallax expressing a difference between an actual position change on said images and a virtual position change according to an affine transformation determined from changes of positions of said multiplicity of feature points on said images.

7. The apparatus of claim 1, wherein the feature point extraction means also extracts a multiplicity of feature points distributed over the object in said images, and which further comprises:

structure extraction means for extracting a structure of the object by determining relative positions of said multiplicity of feature points in a depth direction on said images according to a ratio of the virtual parallaxes for each two closely located ones of said multiplicity of feature points.

8. The apparatus of claim 7, wherein the structure extraction means also determines a texture data indicating a gradient of the object surface according to the determined relative positions of said multiplicity of feature points.

9. The apparatus of claim 1, wherein the command input means determines the command indicated by the motion by generating a gesture pattern expressing the motion and making a matching of the generated gesture pattern with one of predetermined gesture patterns corresponding to predetermined commands.

10. The apparatus of claim 1, further comprising:

display means for displaying a 3D model which moves in accordance with the motion indicated by the command inputted by the command input means.

11. The apparatus of claim 10, wherein the display means also displays said images in superposition to the 3D model.

12. A 3D human interface apparatus for facilitating 3D pointing and controlling command inputs by an operator, comprising:

image input means for entering a plurality of time series images of an object operated by the operator into a motion representing a command;

feature point extraction means for extracting a multiplicity of feature points distributed over an entire imaging field of said images;

object detection means for detecting the object in said images by calculating translational motion directions on said images for said multiplicity of feature points, plotting a distribution plot of the translational motion directions over the entire imaging field, and separating an area having identical and distinctive translational motion directions distributed therein in the distribution plot as the object;

motion recognition means for recognizing the motion of said area separated as the object by image processing said images; and command input means for inputting the command indicated by the motion of the object recognized by the motion recognition means.

13. The apparatus of claim 12, wherein the object detection means calculates the translational motion directions according to virtual parallaxes of the feature points, each virtual parallax expressing a difference between an actual position change on said images and a virtual position change according to an arline transformation determined from changes of positions of the feature points on said images.

14. A 3D human interface apparatus for facilitating 3D pointing and controlling command inputs by an operator, comprising:

image input means for entering a plurality of images of an object operated by the operator into a motion representing a command;

feature point extraction means for extracting a multiplicity of feature points distributed over the object in said images;

structure extraction means for extracting a structure of the object by determining relative positions of said multiplicity of feature points in a depth direction on said images according to a ratio of virtual parallaxes for each two closely located ones of said multiplicity of feature points, each virtual parallax expressing a difference between an actual position change on said images and a virtual position change according to an arline transformation determined from changes of positions of the feature points on said images;

motion recognition means for recognizing the motion of the object by image processing said images;

command input means for inputting the command indicated by the motion of the object recognized by the motion recognition means; and display means for displaying a 3D model having the structure of the object as extracted by the structure extraction means which moves in accordance with the motion indicated by the command inputted by the command input means.

15. The apparatus of claim 14, wherein the structure extraction means also determines a texture data indicating a gradient of the object surface according to the determined relative positions of said multiplicity of feature points.

* * * * *